United States Patent
Yehaskel et al.

(10) Patent No.: US 8,620,944 B2
(45) Date of Patent: Dec. 31, 2013

(54) SYSTEMS AND METHODS FOR KEYWORD ANALYZER

(75) Inventors: David M. Yehaskel, Austin, TX (US); Henrik M. Kjallbring, Austin, TX (US)

(73) Assignee: Demand Media, Inc., Santa Monica, CA (US)

( * ) Notice: Subject to any disclaimer, the term of this patent is extended or adjusted under 35 U.S.C. 154(b) by 379 days.

(21) Appl. No.: 12/877,935

(22) Filed: Sep. 8, 2010

(65) Prior Publication Data

US 2012/0059849 A1 Mar. 8, 2012

(51) Int. Cl.
*G06F 17/30* (2006.01)

(52) U.S. Cl.
USPC ........................................................ 707/769

(58) Field of Classification Search
USPC .................................. 707/769, 772
See application file for complete search history.

(56) References Cited

U.S. PATENT DOCUMENTS

| | | | |
|---|---|---|---|
| 5,974,412 A | 10/1999 | Hazlehurst et al. | |
| 6,199,061 B1 * | 3/2001 | Blewett et al. ........................ | 1/1 |
| 6,266,570 B1 | 7/2001 | Hocherl et al. | |
| 7,222,078 B2 | 5/2007 | Abelow | |
| 7,599,922 B1 | 10/2009 | Chen et al. | |
| 7,636,732 B1 * | 12/2009 | Nielsen ................. | 1/1 |
| 2002/0073019 A1 | 6/2002 | Deaton | |
| 2006/0155656 A1 | 7/2006 | Kreder et al. | |
| 2007/0266342 A1 | 11/2007 | Chang et al. | |
| 2008/0104542 A1 * | 5/2008 | Cohen et al. .................. | 715/810 |
| 2009/0077124 A1 * | 3/2009 | Spivack et al. ............ | 707/103 Y |
| 2009/0119268 A1 * | 5/2009 | Bandaru et al. ................... | 707/3 |
| 2009/0248510 A1 | 10/2009 | Ahluwalia | |
| 2009/0254543 A1 | 10/2009 | Ber et al. | |
| 2009/0327223 A1 | 12/2009 | Chakrabarti et al. | |
| 2010/0082452 A1 | 4/2010 | Speers et al. | |
| 2010/0131902 A1 | 5/2010 | Teran et al. | |
| 2010/0211564 A1 * | 8/2010 | Cohen et al. .................. | 707/722 |
| 2011/0093488 A1 | 4/2011 | Amacker et al. | |
| 2012/0072435 A1 * | 3/2012 | Han .............................. | 707/754 |

OTHER PUBLICATIONS

International Application No. PCT/US2011/042460, International Search Report and Written Opinion, Feb. 17, 2012.

* cited by examiner

*Primary Examiner* — John Breene
*Assistant Examiner* — Joshua Bullock
(74) *Attorney, Agent, or Firm* — Greenberg Traurig, LLP

(57) ABSTRACT

In one embodiment, a system and method is provided to browse and analyze files comprising text strings tagged with metadata. The system and method comprise various functions including browsing the metadata tags in the file, browsing the text strings, selecting subsets of the text strings by including or excluding strings tagged with specific metadata tags, selecting text strings by matching patterns of words and/or parts of speech in the text string and matching selected text strings to a database to identify similar text string. The system and method further provide functions to generate suggested text selection rules by analyzing a selected subset of a plurality of text strings.

15 Claims, 9 Drawing Sheets

FIGURE 4

SYSTEMS AND METHODS FOR KEYWORD ANALYZER

FIELD

At least some embodiments disclosed herein relate generally to the field of electronic information processing and, more particularly but not limited to, associating one or more attributes to text strings (e.g., search queries) that satisfy one or more conditions in a plurality of rules and selecting one or more text strings on the basis of such attributes.

BACKGROUND

The Internet provides a convenient way to interact and to request various types of information. People can use the Internet, for example, to communicate with each other, share information, and organize virtual communities (e.g., a social network).

One way of requesting information using the Internet is by using a search tool on a web site (e.g., Google search service). Some search tools allow a user to search using a search query. For example, a user may enter a location and a query for "Italian restaurants" to identify Italian restaurants in a specified area or location. Various web sites, including some social networks, are able to accept search queries from users. A search query indicates the information that a user is seeking.

Search services typically log search queries executed on such services. These query logs can provide a rich source of information which can be mined to gain insight into topics that are of interest to users.

BRIEF DESCRIPTION OF THE DRAWINGS

The embodiments are illustrated by way of example and not limitation in the figures of the accompanying drawings in which like references indicate similar elements.

FIG. 4 shows the tags view of the user interface shown in FIG. 3 after two tag level filters, "f-about" and "i-amounts" have been applied to a set of tagged titles.

DETAILED DESCRIPTION

Figure 1:
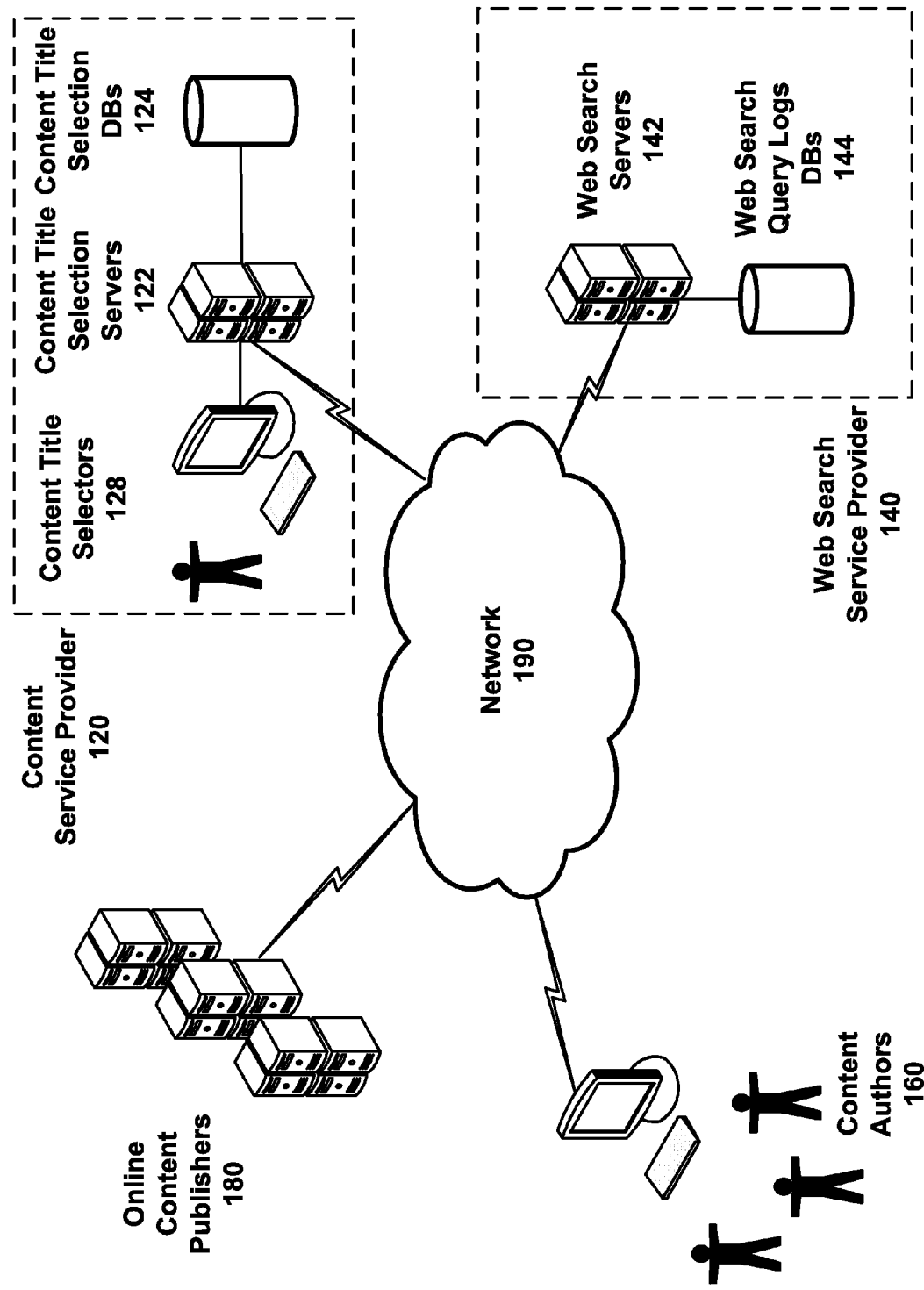
FIG. 1 illustrates a high-level view of components of one embodiment of systems that can support evaluating search queries to identify titles for content production.

The following description and drawings are illustrative and are not to be construed as limiting. Numerous specific details are described to provide a thorough understanding. However, in certain instances, well known or conventional details are not described in order to avoid obscuring the description. References to one or an embodiment in the present disclosure are not necessarily references to the same embodiment; and, such references mean at least one.

Reference in this specification to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not other embodiments.

For the purposes of this disclosure, "content" or "online content" should be understood to refer to various types of digital objects accessible over the Internet embodying the expression of one or more concepts that may be of interest to users. In one embodiment, content may take the form of text articles, such as news articles or topical articles relating to one or more topics. In one embodiment, content may take the form of multimedia objects, such as images, audio presentations, and audiovisual presentations relating to one or more topics.

For the purposes of this disclosure, "search term" should be understood to represent a string of one or more tokens that can convey a concept or set of concepts and can be used in queries to search a database for entries relating to such concepts. A search term could comprise a single character or symbol, a single keyword or keyword stem, or group of keywords or a natural language phrase. Search terms can be used to form search queries for input to various search engines, such as, for example, database search engines and web search engines. In various embodiments, search queries can comprise one or more search terms combined using implicit or explicit relationships (e.g. logical operators such as AND and OR). Search queries input to web search engines are commonly used by users to locate online content.

For the purposes of this disclosure, "title" should be understood to represent a single sentence that could serve as a title for online content. Typically, a title conveys a single concept in a concise way that allows users to readily identify the nature of online content to which such titles are attached.

Overview

Systems and methods are provided to browse files comprising, in various embodiments, lists of information that includes descriptive and/or topical metadata. In one embodiment, the system can be used to browse lists of potential titles for online content that has been tagged with metadata. In one embodiment, the system provides functions to browse and discover titles by tags, dictionaries, rules, part of speech patterns, extracted tags (significant and actual words in the title), or other words/phrases in or relating to the information.

The illustrative implementation below places the presently disclosed systems and methods in the content of an overall system for selecting titles from online query logs. It should be understood, however, that the keyword analyzer described herein could be used to analyze data from any source such as, for example, lists of webpage titles tagged with metadata.

An Illustrative Implementation of a System for Selecting Content Titles

FIG. 1 illustrates a high-level view of components of one embodiment of systems that can support evaluating search queries to identify titles for content production. A content service provider 120 provides online content to online publishers 180. Such content could include any form of electronic content capable of distribution to end users, such as documents and multimedia objects. Such content could relate to any topic of potential interest to online users. Online publishers 180 could offer a broad array of content relating to many topics, or could offer narrowly focused subject matter. In one embodiment, online publishers 180 pay the content provider for online content using any monetization techniques known in the art, such as, for example, by subscription, a flat fee for individual objects or a cost-per-view for individual objects (e.g. a fee charge every time a user views the object on the online publisher's website).

In one embodiment, the content service provider 120 selects titles of potential interest. Such titles can then be provided to content authors 160 who develop content relating to the titles for the content provider 120. The authors 160 could be employees of the content service provider 120 or could be independent contractors or employees of another entity. In one embodiment, the content provider 120 identifies potential titles, at least in part, by analyzing query logs for Internet searches performed by users.

In one embodiment, content title selection servers 122 collect query logs from one or more web search service providers 140 over a network 190, such as the Internet. In one embodiment, the web search service provider maintains one or more web search servers 142 connected to the Internet that provide web search services (e.g. web queries) to end users. The web search servers 142 maintain one or more query logs 144 that log all, or substantially all, web queries entered by end users. In one embodiment, the web search servers 142 provides means, such as an API or an FTP server, for content title selection servers 122 of a content service provider to periodically or continuously download data derived from web search query logs 144, such as, for example, all queries issued by users within a defined time range.

In one embodiment, the content title selection servers 122 process query log data retrieved from the web search service provider 140 to identify search queries that are potential content. Such processing could include automatically selecting a subset of the material in the query logs as potential titles using rule-based processing. Such processing could include tagging selected titles with various types of metadata. Such processing could include providing tools to content title selectors 128 to browse and analyze tagged titles for the purpose of selecting titles for publication to content authors.

The systems shown in FIG. 1 are purely illustrative, and other configurations are possible, as will be readily apparent to those skilled in the art. For example, web query services, content development and authoring services and online publishing services could all be provided by a single service provider and hosted on one or a cluster of networked servers located at one or more physical locations.

Figure 2:
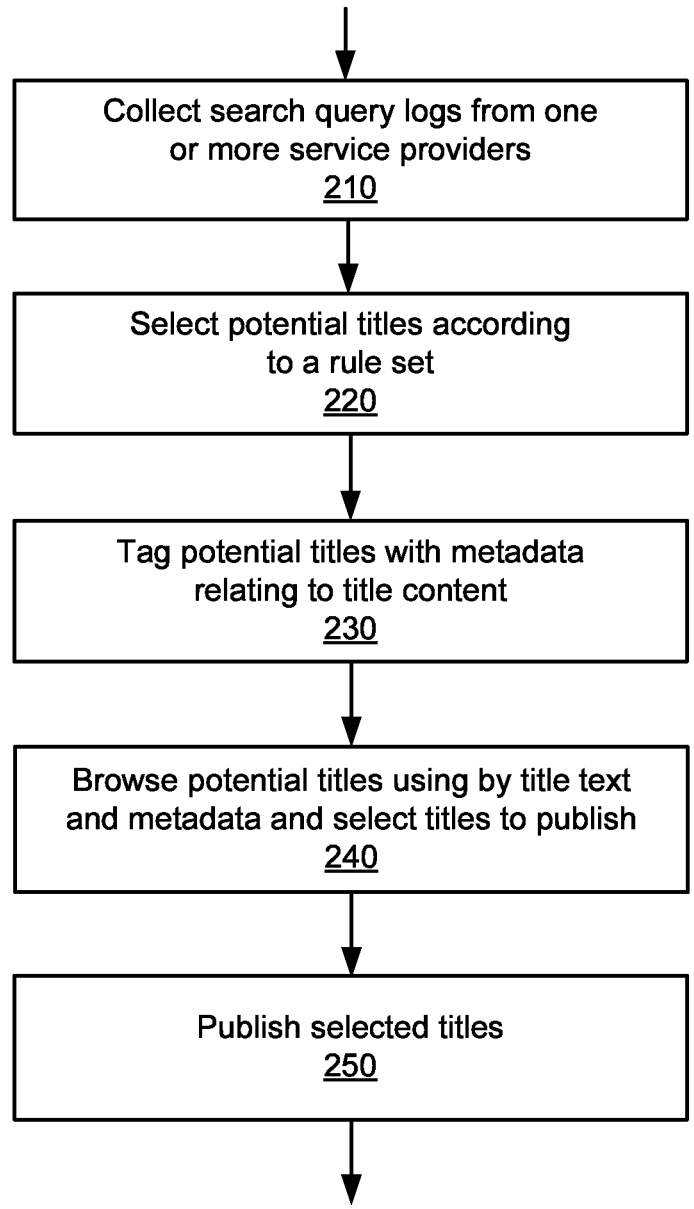
FIG. 2 illustrates one embodiment of an overall process for processing and analyzing raw information derived from the Internet to select potential titles for online content.

FIG. 2 illustrates one embodiment of an overall process for processing and analyzing raw information derived from the Internet to select potential titles for online content. It should be understood that the present system and method could, however, be used to browse any lists of information comprising strings of information that have been tagged with metadata.

In block 210, raw query log information is obtained from one or more information sources. In one embodiment, the query log information could be obtained from one or more search services, such as Yahoo or Google, or third parties that sell similar information. It should be understood that the systems and methods disclosed herein need not be limited to information derived from query logs, but could be applied to any data source, such as, for example, lists of web page titles or third party data aggregation services.

In block 220, the raw query log information is then processed to select search queries for potential titles for online content. In one embodiment, potential titles could be selected using a rule-based process such as that described in U.S. patent application Ser. No. 12/828,200, filed Jun. 30, 2010, entitled "Rule-Based System and Method to Associate Attributes to Text Strings," the contents of which are incorporated by reference herein in its entirety.

In block 230, the potential titles are then processed to tag the potential titles with metadata. Metadata tags can comprise any word, group of words, phrase or symbol that help to define, characterize or provide information about potential titles. For example, a tag could comprise a subject (e.g. Ferrari sports cars), a category (e.g. cars, or sports cars), an action (e.g. fixing), a type of article (e.g. a review), or an online property of the potential title (e.g. high traffic or low traffic).

In one embodiment, metadata tags are associated with the selected queries using a rule based process such as that described in U.S. patent application Ser. No. 12/828,200. Metadata tags could include data that represents an estimate of the lifetime value of content associated with the potential titles such as described in U.S. patent application Ser. No. 12/826,524, filed Jun. 29, 2010, entitled "System and Method For Evaluating Search Queries To Identify Titles For Content Production," the contents of which are incorporated by reference herein in its entirety.

In block 240, the file comprising the tagged potential titles is then read into a keyword analyzer and viewed by content title selectors to select content titles for publication to content producers. In one embodiment, the keyword analyzer provides a user interface that provides the following functions for various types of input files as listed below:

| Files | Browse by: |
| --- | --- |
| Results file of search queries | Inclusion or exclusion |
| Results file of titles | Tags |
| Rules files | Dictionaries |
| Results file of tags | Rules |
| Results file of dictionaries | Extracted words |
| | Free text (words and/or phrases) |
| | Part of speech - individual or POS phrases |
| | First word |
| | Last word |

In one embodiment, a relatively small sample of search queries can viewed by content title selectors, and various criteria supported by the keyword analyzer can be applied to the sample to meet the needs of the content producers. For example, content producers may want titles or articles about fashion including "belts," but "belts" might also show up in auto titles and home electronics titles. Using other tags such as, for example, "fashion" or "clothing" or "accessories," fashion oriented titles could be selected, and using tags such as "auto" or "electronics," titles unrelated to fashion could be excluded. In one embodiment, as described in detail below, titles could also be browsed and additional user rules can be applied on an ad hoc basis, for example, titles that don't include certain parts of speech patterns or individual words could be selected. When the content producer is satisfied with the focus of the winnowed list, the conditions (rules) used to select the list can be copied and used to select queries or titles that match such conditions in a large set of search queries (e.g. all queries for a date range).

In block 250, the selected titles are then published to content producers. The titles could be published in any format suitable for publication of information to remote users, including emails, text messages, one or more web sites.

An Illustrative Implementation of a Keyword Analyzer

The FIGS. 3-8 illustrate one embodiment of a user interface of a keyword analyzer. It should be understood that the functionality provided by the user interface could be presented to the user in other formats. The examples provided illustrate the display and processing of a set of data which includes a specific set of tags, keywords and topics. It should be understood that the methods embodied in the interface could be used to process any set of data comprising one or more lists of information tagged with descriptive metadata.

Figure 3:
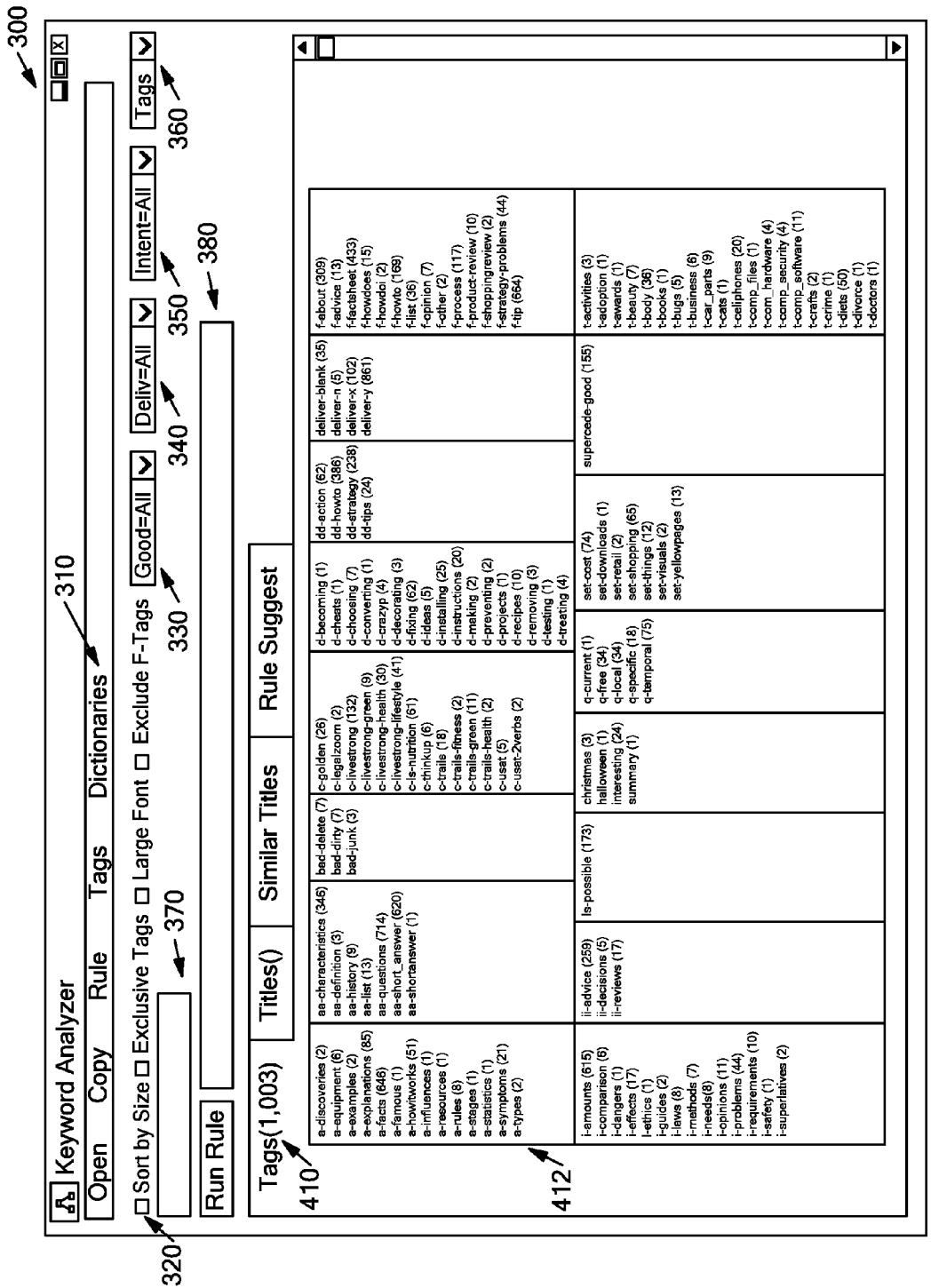
FIG. 3 illustrates one embodiment of a user interface of a keyword analyzer.

FIG. 3 illustrates one embodiment of a user interface 300 of a keyword analyzer. The interface provides a set of dropdown menus and/or selectable functions 310 including "Open," "Copy," "Rule," "Tags" and "Dictionaries" menus/functions. The "Open" menu allows users to select data files to be processed by the keyword analyzer. The "Copy" function copies whatever the user is browsing at the time to the operating system clipboard. For example, if the user is viewing the tag distribution across a set of titles or queries, the "Copy" function will copy those values. If the user is viewing the titles via the Title tab, the Copy function copies the titles displayed. The "Rule" function copies all conditions/rules that a user has applied, including tags, parts of speech, dictionaries, to the operating system clipboard. The "Tags" menu allows users to view tag sets, as described in U.S. patent application Ser. No. 12/828,200, including tag sets that may have been used to select the data input into the keyword analyzer. The "Dictionaries" menu allows users to view dictionaries that can be referenced in rule sets, as described in U.S. patent application Ser. No. 12/828,200, including dictionaries that may have been used to select the data input into the keyword analyzer.

The interface provides a set of check boxes 320 that condition the display of data on the interface. A "Sort by Size" check box allows users to specify that the display of tags are sorted by the number of titles to which the tag applies, as opposed to the default sorting order, which is alphabetical. An "Exclusive Tags" check box allows users to specify that only titles which have the exact same tags as specified tag inclusion filters (discussed further below) are displayed. Titles that have more or fewer tags than specified are not displayed. A "Large Font" check box allows users to specify that the interface be displayed in a larger font. An "Exclude F-Tags" check box allows users to that any titles that have one or more f-tags are not displayed (F-tags are Format tags, some examples can be seen in FIG. 3 as tags beginning with "f-").

The interface provides a set of drop-down selection boxes 330-360 that further condition the display of data on the interface. A "Good Title" selection box 330 allows a user to choose to display titles and tags relating to such titles that the user has designated as "Good." See in particular, FIG. 5 and FIG. 8 of the present application, and the discussion relating thereto below.

A "Deliverability" selection box 340 allows a user to choose to display only titles and tags relating to such titles which have been tagged as "deliverable," or "not deliverable." The default is to display all titles and tags (Deliv=All). The "deliverability" tag is a tag that can be assigned to a title by a manual or automated process as an assessment of whether a potential title is likely to be consistent with predefined editorial standards and requirements (e.g., a policy manual provided to a contractor hired to review potential titles in order to select a final title). One embodiment of such a process is described in U.S. patent application Ser. No. 12/828,200.

An "Intent" selection box 350 allows a user to choose to display titles and tags relating to such titles which have been tagged as having an intent of "informational" ("Yes" or "No"). The default is to display all intents (both "Yes" and "No"). The "Intent" is a tag that can be assigned to a title by a manual or automated process as an assessment of whether a query on which the title is based is likely informational, that is to say, seeking information (e.g. content), as opposed to, for example, being purely navigational (e.g. seeking a specific website). One embodiment of such a process is described in U.S. patent application Ser. No. 12/828,200.

In FIG. 3, The "Tags" tab 410 initially shows all tags that the keyword analyzer has identified in the input file. Each tag in the tag list displays a count of how many titles have that tag. In one embodiment, tags are free form text that can comprise any sequence of an arbitrary number of characters that indicate a title has satisfied a particular tagging rule. The actual tag text need not express the meaning of the tag, although typically users will choose to create meaningful tag names (e.g. "motorcycles" for titles relating to motor cycles). The interface can display the tags using any layout that helps the user navigate through the tags.

In the illustrated embodiment, the tags are visually separated into boxes 412 displayed on the interface. Each box displays tags with a specific tag prefix defined as a set of characters delineated from the tag body by a hyphen (i.e., "-"). In one embodiment, tag prefixes can be used to namespace tags (e.g., "D-", "T-", etc.) to group like tags together into one or more categories. For example, all action tags like "fixing," "making," "installing," etc., may be assigned a "D-" prefix indicating that these tags have something in common with each other (in this example, the D-tags are all action-based concepts). Prefix namespaces may also be used to create an ad-hoc hierarchy (e.g., "T-software" is a type of "TT-computers"). This ad-hoc hierarchy may be used, for example, to see or use a category (e.g., "computers") after it has been broken down into more detail (e.g., "software" and "hardware"). Alternatively, no tag prefixes need be used at all.

In the illustrated embodiment, if the user clicks on a tag, the user interface applies a tag level filter for the selected tag to the displayed result. In one embodiment, the user interface immediately finds all titles that have the selected tag, and re-draws the tags view to show the tag distribution for the new titles set, including, for each tag, a revised count of the number of titles to which the tag relates under the tag level filter. A user can click on multiple tags in succession to apply a set of tag filters to be applied to the tags view. In one embodiment, the user interface allows a user to negatively select dictionaries or tags, specifically excluding all titles or queries that match a particular condition (e.g. using a Control+click user interface action).

Figure 4:
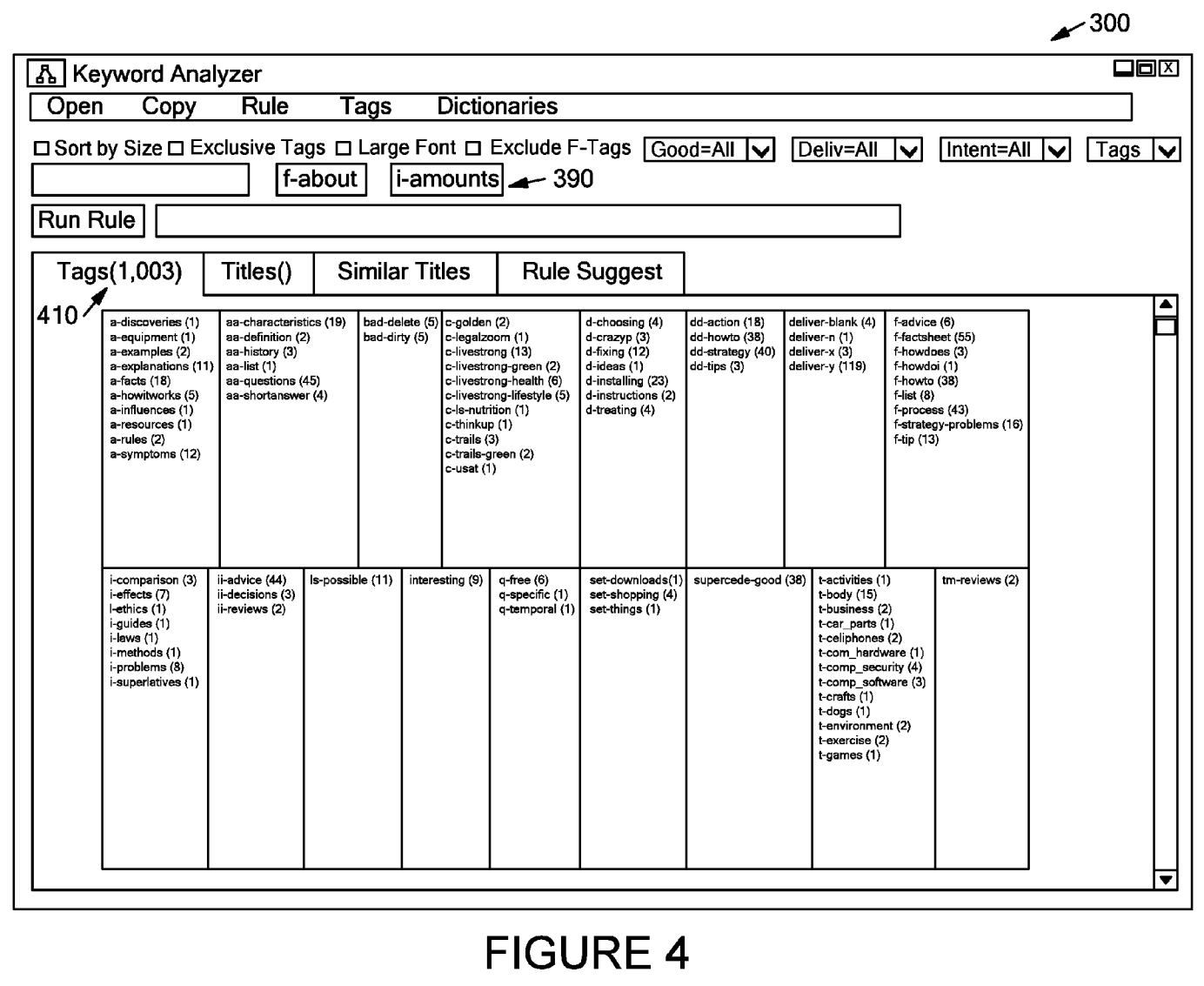

FIG. 4 shows the tags view 410 shown in FIG. 3 after two tag level filters, "f-about" and "i-amounts" have been applied to a set of tagged titles. The tag level filters display on the interface as two tag level filter buttons 390. The "f-about" filter is a filter to include titles labeled with the "f-about" tag (as expressed by the white color of the associated tag filter button). The "i-amounts," is a filter to exclude titles labeled with the "i-amounts" tag (as may be expressed by a particular color, such as red, or a reverse video display of the associated tag filter button).

In one embodiment, the tag filter buttons 390 are dynamically added to the interface when the user selects tags in the tags view 410. In one embodiment, once the buttons are added to the interface, the user can select a tag filter button 390 to set the respective filter off and remove the button from the interface. As filters are added or removed, the tags view 410 is updated to reflect tags for titles selected by the respective filters.

Figure 5:
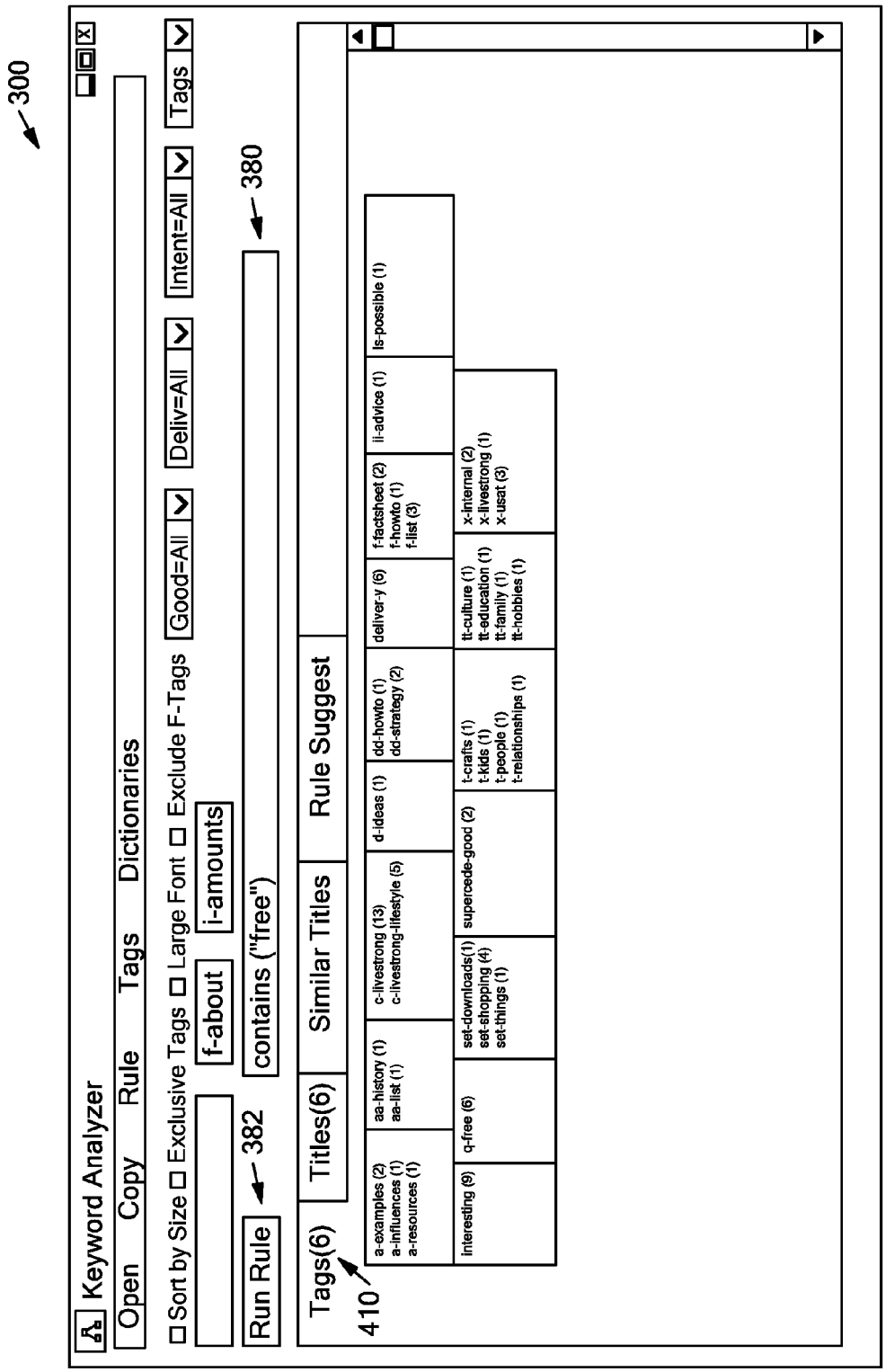
FIG. 5 shows the tags view of the user interface shown in FIG. 4 after a free-form text rule "contains ("free")" has been entered in a free-form rule entry text box and the user has clicked the run rule button.

FIG. 5 shows the tags view 410 shown in FIG. 4 after a free form text rule "contains ("free")" has been entered in a freeform rule entry text box 380 and the user has clicked the run rule button 382. The rule is used to select titles from among the set of titles filtered by the "f-about" and "i-amounts" tag filters for titles that contain the word free at any position in the title. In one embodiment, the free form rules function provides users the ability to specify rules to select or exclude titles whose text matches any word, word pattern or phrase. In one embodiment, a user simply selects the freeform rule entry text box and types in a rule following a syntax supported by the keyword analyzer for searching title text. In one embodiment, the freeform rule entry text box could provide the user a dropdown list of possible rules. In one embodiment, the rule syntax supported by the interface is the set described in U.S. patent application Ser. No. 12/828,200, although it is understood that other types of selection rules could be supported in alternate embodiments (e.g. regular expressions).

Figure 6:
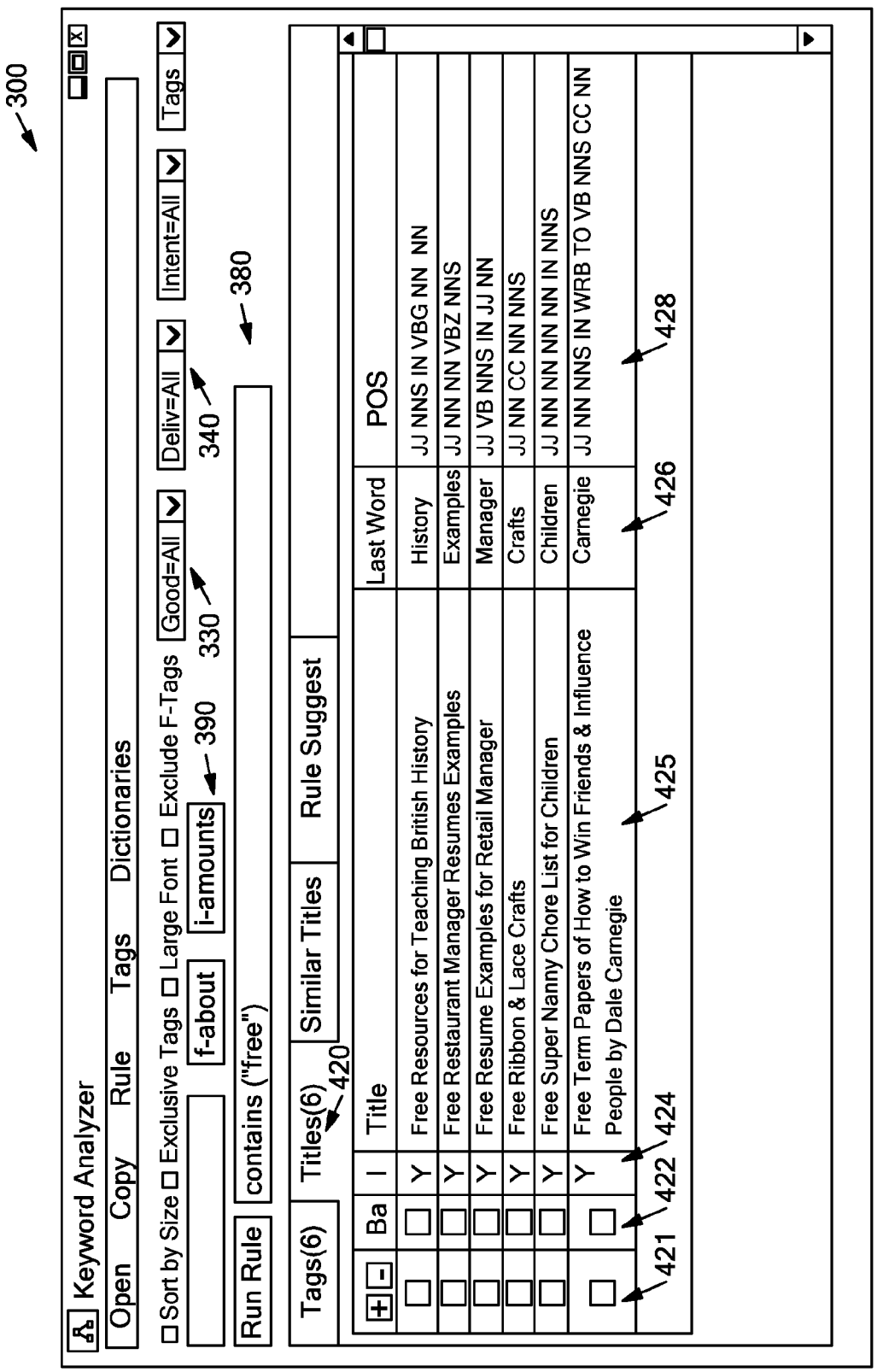
FIG. 6 shows one embodiment of a display of the title view tab of the user interface of FIG. 5 displaying six titles that meet the various selection criteria entered via the tags tab and in the free-form rule entry text box.

FIG. 6 shows one embodiment of a display of the title view tab 420. At any time when a user is in tags view 410 of FIG. 5, the user can click on the titles tab to display titles that meet the various tag filters and free form rules the user has selected. FIG. 6 shows one embodiment of a display of the title view tab 420 of the user interface displaying six titles that meet the various selection criteria 380 and 390 entered via the tags tab 410 as shown above. The full text of the selected titles 425 is displayed. As additional aids to navigating the results, the last word of each title 426 and the parts of speech comprising the individual words of the title 428 are displayed.

The interface as displayed additionally provides a column that displays the deliverability of the query 424 from which the title derives. In the illustrated embodiment, all of the titles display the code "Y", indicating all titles were flagged as deliverable. If the display included titles with the code "N" (i.e. flagged as not deliverable), such titles could be excluded from the display by selecting "Deliv=Yes" from the deliverability drop down list 340.

The interface as displayed additionally provides columns that allow a user to flag the title as being "Good" 421 or "Bad" 422. A title could be considered "Good" if it closely expresses the user's intent in searching for potential titles. A title could be considered "Bad" if it runs contrary to user's intent in searching for potential titles. If the user wishes to display only titles checked as "Good," the user can select "Good=Yes" from the "Good Title" drop down list 330. If the user wishes to display only titles not checked as "Good," the user can select "Good=No" from the "Good Title" drop down list 330.

At any time while in the titles view 420, the user can swap back to the tags view 410. To the extent any actions the user has taken in the titles view has selected a subset of titles for display, such as suppressing the display of non-deliverable titles or titles not checked as "Good," the tag display is updated to reflect the tag set of the selected titles, including revised counts for each displayed tag.

At any time while the in any of the views/tabs supported by the user interface, the user can chose to generate a text representation of the tag filters and freeform rules the user has selected. For example, a text representation of the selection criteria 380 and 390 in FIG. 6 could be HasTag(1,"f-about") AND NOT HasTag(1,"i-amounts") AND contains("free").

Figure 7:
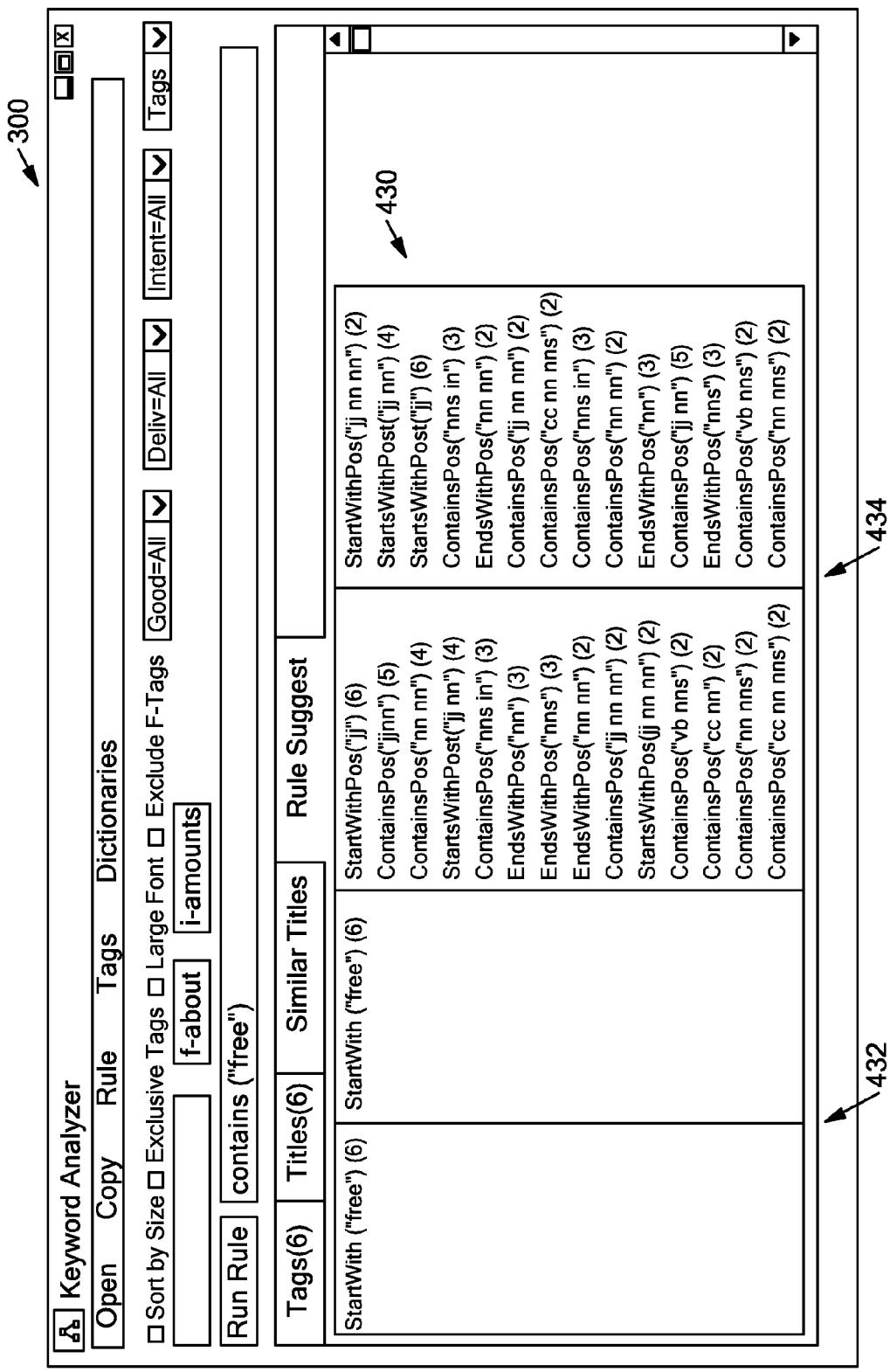
FIG. 7 shows one embodiment of a display of the rule suggest tab of the user interface of FIG. 6 displaying a number of suggested rules.

FIG. 7 shows one embodiment of a display of the rule suggest tab 430 of the user interface displaying a number of suggested rules. At any time when a user is in the tag view tab 410 or the title view tab 420, the user can generate suggested rules by hitting or clicking on a pre-defined key. The rules are generated by analyzing the all the visible titles in the title view tab 420. The user can then click on the rule suggest tab 440 to display suggested title selection rules. In one embodiment, the interface generates suggested title selection rules by analyzing text and parts of speech patterns in all of the titles selected via the tag view tab 420 and/or the title view tab 430 to create rules that select all or a subset of all the selected titles. In one embodiment, the interface generates suggested title selection rules by analyzing text and parts of speech patterns in the titles flagged as "Good" and "Bad" to create rules that select titles designated as "Good" and do not select titles designated as "Bad."

In the illustrated embodiment, the rule suggest tab 430 displays two groups of two view panes each displaying rules based on text selection criteria 432 and two view panes displaying rules based on parts of speech patterns 434. In the illustrated embodiment, each rule is displayed along with a count of how many titles match that rule. In one embodiment, the first view within each group is sorted by descending frequency, i.e. how many titles match that rule. The second view within each group is sorted by descending "uniqueness" score, which is a measure of how specific a rule is. The more words or parts of speech that are used in a rule, the more "unique" that rule is. In one embodiment, "StartsWith" and "EndsWith" functions are considered to be more specific than the "Contains" function, and so words associated with these functions contribute to a higher uniqueness score. In one embodiment, the user can select any of the suggested rules to be applied to the tag and title set that is currently displayed by the keyword analyzer. In one embodiment, the selected rule is moved to the freeform rule entry text box 380 and processed as a freeform rule entered by the user.

Figure 8:
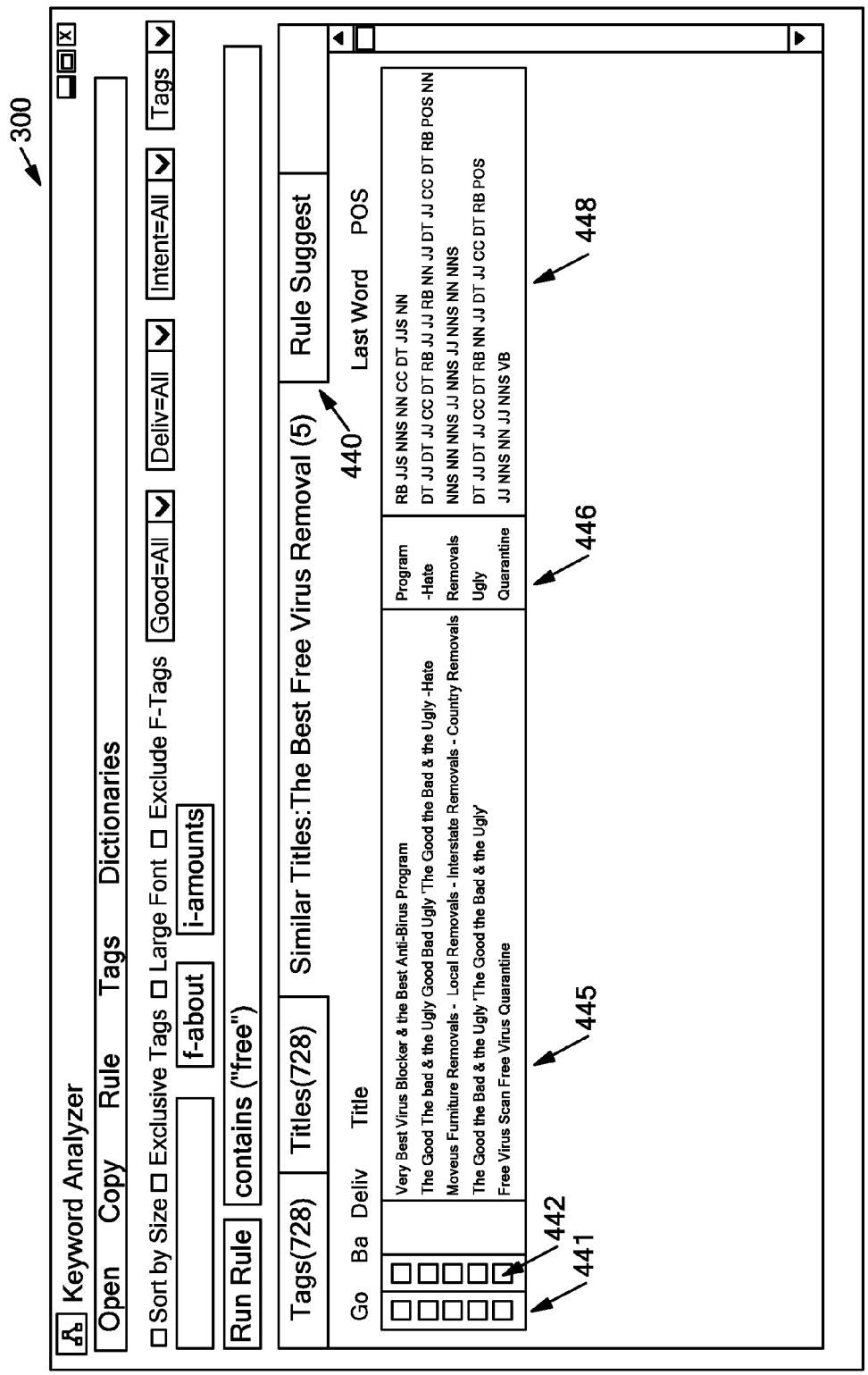
FIG. 8 shows one embodiment of a display of the similar titles tab of the user interface of FIG. 7 displaying five titles that meet the similar to a selected title "The Best Free Virus Removal."

FIG. 8 shows one embodiment of a display of the similar titles tab 440 displaying five titles that are similar to a selected title "The Best Free Virus Removal." At any time when a user is in the title view tab 420 (illustrated in FIG. 6), the user can select a specific title, hit or click on a specified key, and click on the similar titles tab 440 to display titles are that are similar to the selected title. In one embodiment, similar titles are selected by performing a full text search against a titles database separate from the input tagged titles file processed by the keyword analyzer.

The full text of the similar titles 445 is displayed. As additional aids to navigating the results, the last word of each title 446 and the parts of speech comprising the individual words of the title 448 are displayed. The interface as displayed additionally provides columns that allow the user to flag the displayed titles as being "Good" 441 or "Bad" 442. In one embodiment, the user can use the similar titles selected as "Good" and "Bad" to generate suggested rules by clicking on the suggested rules tab 430.

It should be understood that the various embodiments of the keyword analyzer disclosed above are illustrative, and not limiting. Those skilled in the art will appreciate that the functions provided by the keyword analyzer can be implemented in a variety of other ways that provide additional advantages.

For example, in one embodiment, the keyword analyzer provides the capability to receive input relating to an input file from groups of people on client devices coupled to a network (e.g., a poll of the public, or group of employees). For example, the keyword analyzer could receive "Good" and "Bad" designations for titles from a group of content selectors. Such capabilities could be provided via, for example, a shared keyword analyzer session. Alternatively, as an input file is analyzed by a given selector, when a title is tagged as "Good" or Bad," a master copy of the file could be tagged with "Good" and "Bad" metadata tags, and other content selectors are able to view the "Good" and "Bad" tags via the keyword analyzer interface.

In another example, in one embodiment, one or more functions provided by the keyword analyzer through the user interface could be provided through automated server processes. For example, the keyword analyzer could support a scripted mode, where a script defines a set of operations (e.g. read a file, select a set of tags and flag the selected tags as "Good").

Figure 9:
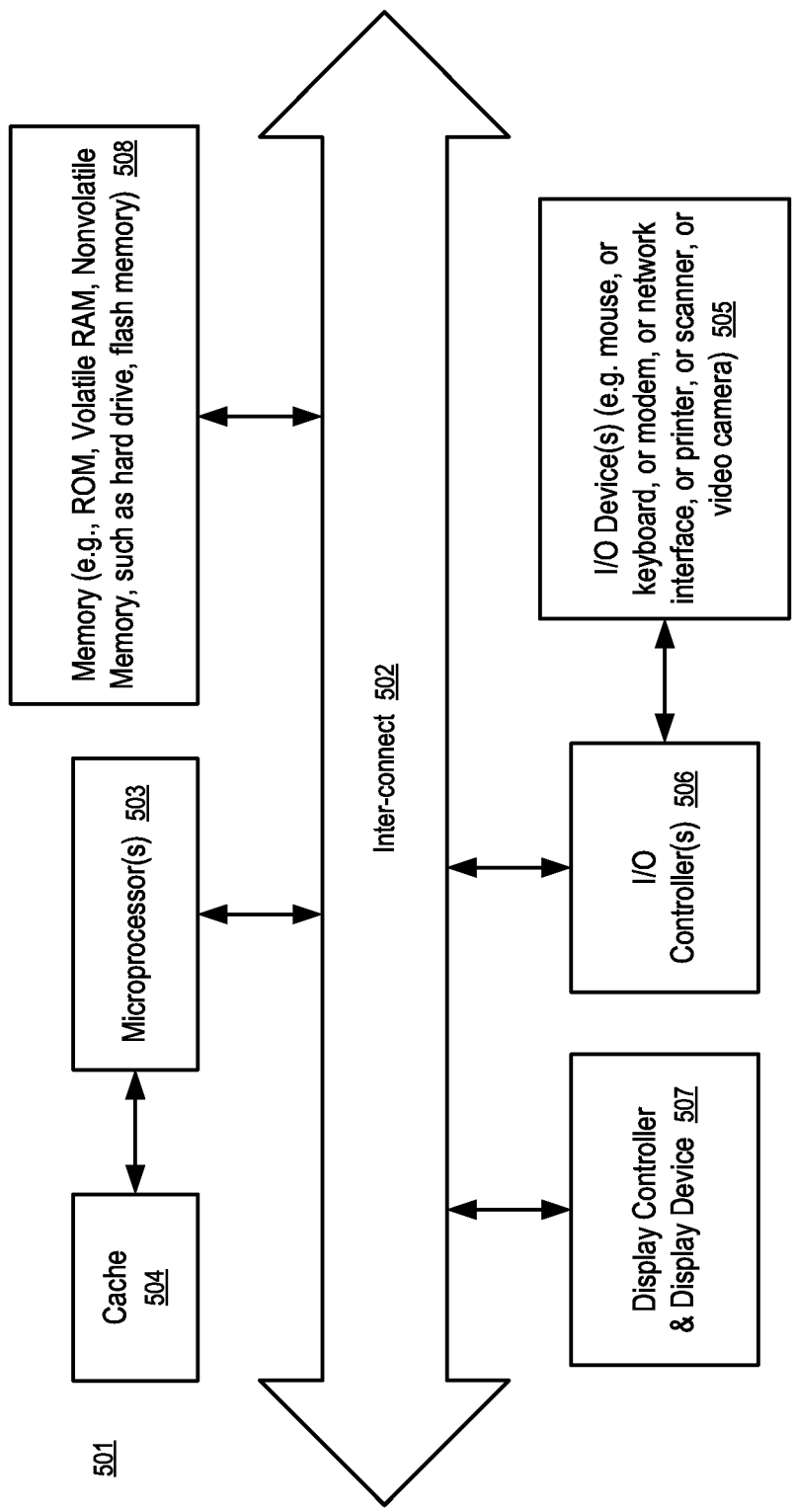
FIG. 9 shows a block diagram of a data processing system which can be used in various embodiments to implement the application of rules to text strings as discussed above.

FIG. 9 shows a block diagram of a data processing system which can be used in various embodiments to implement the application of rules to text strings as discussed above. For example, FIG. 9 could represent the architecture of content title selection servers 122. While FIG. 9 illustrates various components of a computer system, it is not intended to represent any particular architecture or manner of interconnecting the components. Other systems that have fewer or more components may also be used.

In FIG. 9, the system (501) includes an inter-connect (502) (e.g., bus and system core logic), which interconnects a microprocessor(s) (503) and memory (508). The microprocessor (503) is coupled to cache memory (504) in the example of FIG. 9.

The inter-connect (502) interconnects the microprocessor(s) (503) and the memory (508) together and also interconnects them to a display controller and display device (507) and to peripheral devices such as input/output (I/O) devices (505) through an input/output controller(s) (506). Typical I/O devices include mice, keyboards, modems, network interfaces, printers, scanners, video cameras and other devices which are well known in the art.

The inter-connect (502) may include one or more buses connected to one another through various bridges, controllers and/or adapters. In one embodiment the I/O controller (506) includes a USB (Universal Serial Bus) adapter for controlling USB peripherals, and/or an IEEE-1394 bus adapter for controlling IEEE-1394 peripherals.

The memory (508) may include ROM (Read Only Memory), and volatile RAM (Random Access Memory) and non-volatile memory, such as hard drive, flash memory, etc.

Volatile RAM is typically implemented as dynamic RAM (DRAM) which requires power continually in order to refresh or maintain the data in the memory. Non-volatile memory is typically a magnetic hard drive, a magnetic optical drive, or an optical drive (e.g., a DVD RAM), or other type of memory system which maintains data even after power is removed from the system. The non-volatile memory may also be a random access memory.

The non-volatile memory can be a local device coupled directly to the rest of the components in the data processing system. A non-volatile memory that is remote from the system, such as a network storage device coupled to the data processing system through a network interface such as a modem or Ethernet interface, can also be used.

In one embodiment, a data processing system as illustrated in FIG. 9 is used to implement one or more of the content title selection servers 122 and content title editing stations 128 of FIG. 1.

In some embodiments, one or more servers of the system can be replaced with the service of a peer to peer network of a plurality of data processing systems, or a network of distributed computing systems. The peer to peer network, or a distributed computing system, can be collectively viewed as a server data processing system. In some embodiments, functions provided by the keyword analyzer may be supported by a plurality of data processing systems where individual functions provided by the keyword analyzer are implemented on separate data processing systems.

Embodiments of the disclosure can be implemented via the microprocessor(s) (503) and/or the memory (508). For example, the functionalities described can be partially implemented via hardware logic in the microprocessor(s) (503) and partially using the instructions stored in the memory (508). Some embodiments are implemented using the microprocessor(s) (503) without additional instructions stored in the memory (508). Some embodiments are implemented using the instructions stored in the memory (508) for execution by one or more general purpose microprocessor(s) (503). Thus, the disclosure is not limited to a specific configuration of hardware and/or software.

In this description, various functions and operations may be described as being performed by or caused by software code to simplify description. However, those skilled in the art will recognize what is meant by such expressions is that the functions result from execution of the code by a processor, such as a microprocessor. Alternatively, or in combination, the functions and operations can be implemented using special purpose circuitry, with or without software instructions, such as using an Application-Specific Integrated Circuit (ASIC) or a Field-Programmable Gate Array (FPGA). Embodiments can be implemented using hardwired circuitry without software instructions, or in combination with software instructions. Thus, the techniques are limited neither to any specific combination of hardware circuitry and software, nor to any particular source for the instructions executed by the data processing system.

While some embodiments can be implemented in fully functioning computers and computer systems, various embodiments are capable of being distributed as a computing product in a variety of forms and are capable of being applied regardless of the particular type of machine or computer-readable media used to actually effect the distribution.

At least some aspects disclosed can be embodied, at least in part, in software. That is, the techniques may be carried out in a computer system or other data processing system in response to its processor, such as a microprocessor, executing sequences of instructions contained in a memory, such as ROM, volatile RAM, non-volatile memory, cache or a remote storage device.

Routines executed to implement the embodiments may be implemented as part of an operating system, middleware, service delivery platform, SDK (Software Development Kit) component, web services, or other specific application, component, program, object, module or sequence of instructions referred to as "computer programs." Invocation interfaces to these routines can be exposed to a software development community as an API (Application Programming Interface). The computer programs typically comprise one or more instructions set at various times in various memory and storage devices in a computer, and that, when read and executed by one or more processors in a computer, cause the computer to perform operations necessary to execute elements involving the various aspects.

A machine readable medium can be used to store software and data which when executed by a data processing system causes the system to perform various methods. The executable software and data may be stored in various places including for example ROM, volatile RAM, non-volatile memory and/or cache. Portions of this software and/or data may be stored in any one of these storage devices. Further, the data and instructions can be obtained from centralized servers or peer to peer networks. Different portions of the data and instructions can be obtained from different centralized servers and/or peer to peer networks at different times and in different communication sessions or in a same communication session. The data and instructions can be obtained in entirety prior to the execution of the applications. Alternatively, portions of the data and instructions can be obtained dynamically, just in time, when needed for execution. Thus, it is not required that the data and instructions be on a machine readable medium in entirety at a particular instance of time.

Examples of computer-readable media include but are not limited to recordable and non-recordable type media such as volatile and non-volatile memory devices, read only memory (ROM), random access memory (RAM), flash memory devices, floppy and other removable disks, magnetic disk storage media, optical storage media (e.g., Compact Disk Read-Only Memory (CD ROMS), Digital Versatile Disks (DVDs), etc.), among others.

In general, a machine readable medium includes any mechanism that provides (e.g., stores) information in a form accessible by a machine (e.g., a computer, network device, personal digital assistant, manufacturing tool, any device with a set of one or more processors, etc.).

In various embodiments, hardwired circuitry may be used in combination with software instructions to implement the techniques. Thus, the techniques are neither limited to any specific combination of hardware circuitry and software nor to any particular source for the instructions executed by the data processing system.

Although some of the drawings illustrate a number of operations in a particular order, operations which are not order dependent may be reordered and other operations may be combined or broken out. While some reordering or other groupings are specifically mentioned, others will be apparent to those of ordinary skill in the art and so do not present an exhaustive list of alternatives. Moreover, it should be recognized that the stages could be implemented in hardware, firmware, software or any combination thereof.

In the foregoing specification, the disclosure has been described with reference to specific exemplary embodiments thereof. It will be evident that various modifications may be made thereto without departing from the broader spirit and scope as set forth in the following claims. The specification and drawings are, accordingly, to be regarded in an illustrative sense rather than a restrictive sense.

What is claimed is:

1. A method, comprising:
    receiving a plurality of text strings, wherein each of the plurality of text strings has at least one of a plurality of metadata tags;
    determining, via a data processing system, a count of a total number of text strings associated with each of the plurality of metadata tags;
    displaying, via a user interface on a display device, each of the plurality of metadata tags and the respective count for the respective metadata tag;
    receiving, via the user interface, a selected tag of the plurality of metadata tags;
    identifying a string subset of the plurality of text strings associated with the selected tag;
    identifying a tag subset of the plurality of metadata tags comprising all metadata tags associated with the string subset;
    determining a revised count of a total number of text strings within the string subset associated with each of the tag subset;
    displaying, via the user interface, each member of the tag subset along with its respective revised count;
    receiving, via the user interface, an indication that the user wishes to display the string subset;
    displaying, via the user interface, each of the text strings within the string subset;
    receiving, via the user interface, an indication that the user wishes the interface to generate suggested rules for selecting text strings that match a pattern;
    generating a plurality of suggested rules, wherein the plurality of suggested rules are generated by analyzing text and parts of speech patterns in the string subset, wherein each of the suggested rules matches at least one of the text strings within the string subset; and
    displaying, via the user interface, each of the plurality of suggested rules.

2. The method of claim 1, wherein the selected tag further comprises an indication that text strings associated with the metadata tag are to be excluded from the subset of the plurality of text strings, whereby each of the text strings within the string subset is not associated with the selected one of the plurality of metadata tags.

3. The method of claim 1, further comprising:
    receiving, via the user interface, a rule for selecting text strings that match a pattern;
    identifying a string subset of the plurality of text strings, wherein each of the text strings within the string subset matches the rule for selecting text strings;
    identifying a tag subset of the plurality of metadata tags comprising all metadata tags associated with the string subset; and
    determining a revised count of a total number of text strings within the subset of the plurality of text strings associated with each of the subset of the plurality of metadata tags; and
    displaying, via the user interface, each of the subset of the plurality of metadata tags and the respective revised count for the respective metadata tag.

4. The method of claim 1, wherein the display of each of the text strings within the string subset comprises the respective text string, a last word of the respective text string and a representation of the parts of speech of the words comprising the respective text string.

5. The method of claim 4, wherein the display of each of the text strings within the string subset further comprises user interface elements that allow the respective string to be flagged as desirable or undesirable.

6. The method of claim 1, wherein each of the plurality of suggested rules is displayed in conjunction with a count of the number of text strings the respective rule matches in the subset of the plurality of text strings.

7. The method of claim 1, wherein at least one of the plurality of suggested rules is a text pattern matching rule.

8. The method of claim 1, wherein at least one of the plurality of suggested rules is a parts-of-speech pattern matching rule.

9. The method of claim 1, further comprising:
    receiving, via the user interface, an indication that at least a first string of the string subset represents desirable content;
    receiving, via the user interface, an indication that the user wishes the interface to generate suggested rules for selecting text strings that match a pattern;

generating a plurality of suggested rules, wherein plurality of suggested rules are generated by analyzing text and parts of speech patterns in the at least a first string of the string subset, wherein each of the plurality of suggested rules matches the at least a first string of the string subset; and displaying, via the user interface, each of the plurality of suggested rules.

10. The method of claim 9, further comprising:
receiving, via the user interface, an indication that at least a second string of the string subset represents undesirable content,
wherein the plurality of suggested rules are generated by analyzing text and parts of speech patterns in the at least a first string of the string subset and the at least a second string of the string subset, and wherein each of the plurality of suggested rules matches the at least a first string of the string subset and does not match the at least a second string of the string subset.

11. The method of claim 1, further comprising:
receiving, via the user interface, a selection of one of the text strings within the string subset;
receiving, via the user interface, an indication that the user wishes the interface to select similar text strings to the one of the text strings within the string subset; and
identifying, in a database of text strings, a plurality of similar text strings, wherein the plurality of similar text strings are identified by performing a full text search against the database of text strings using the one of the text strings within the string subset;
displaying, via a user interface on a display device, each of the plurality of similar text strings.

12. The method of claim 11, further wherein the display of each of the plurality of similar text strings comprises the respective text string, a last word of the respective text string and a representation of the parts of speech of the words comprising the respective text string.

13. The method of claim 12, wherein the display of each of the subset of the plurality of similar text strings further comprises user interface elements that allow the respective string to be flagged as desirable or undesirable.

14. A non-transitory machine-readable storage media embodying instructions, the instructions causing a data processing system to perform a method, the method comprising:
receiving a plurality of text strings, wherein each of the plurality of text strings has at least one of a plurality of metadata tags;
determining, via a data processing system, a count of a total number of text strings associated with each of the plurality of metadata tags;
displaying, via a user interface on a display device, each of the plurality of metadata tags and the respective count for the respective metadata tag;
receiving, via the user interface, a selection of one of the plurality of metadata tags;
receiving, via the user interface, a selected tag of the plurality of metadata tags;
identifying a string subset of the plurality of text strings associated with the selected tag;

identifying a tag subset of the plurality of metadata tags comprising all metadata tags associated with the string subset;
determining a revised count of a total number of text strings within the string subset associated with each of the tag subset;
displaying, via the user interface, each member of the tag subset along with its respective revised count;
receiving, via the user interface, an indication that the user wishes to display the string subset;
displaying, via the user interface, each of the text strings within the string subset;
receiving, via the user interface, an indication that the user wishes the interface to generate suggested rules for selecting text strings that match a pattern;
generating a plurality of suggested rules, wherein the plurality of suggested rules are generated by analyzing text and parts of speech patterns in the string subset, wherein each of the suggested rules matches at least one of the text strings within the string subset; and
displaying, via the user interface, each of the plurality of suggested rules.

15. A data processing system, comprising:
a display device to display a user interface;
a memory to store a plurality of text strings, wherein each of the plurality of text string has at least one of a plurality of metadata tags; and
a processor configured to:
receive a plurality of text strings, wherein each of the plurality of text strings has at least one of a plurality of metadata tags;
determine a count of a total number of text strings associated with each of the plurality of metadata tags;
display, via a user interface on the display device, each of the plurality of metadata tags and the respective count for the respective metadata tag;
receive, via the user interface, a selection of one of the plurality of metadata tags;
identify a string subset of the plurality of text strings associated with the selected tag;
identify a tag subset of the plurality of metadata tags comprising all metadata tags associated with the string subset;
determine a revised count of a total number of text strings within the string subset associated with each of the tag subset;
receive, via the user interface, an indication that the user wishes to display the string subset;
display, via the user interface, each of the text strings within the string subset;
receive, via the user interface, an indication that the user wishes the interface to generate suggested rules for selecting text strings that match a pattern;
generate a plurality of suggested rules, wherein the plurality of suggested rules are generated by analyzing text and parts of speech patterns in the string subset, wherein each of the suggested rules matches at least one of the text strings within the string subset; and
display, via the user interface, each of the plurality of suggested rules.

* * * * *